(12) United States Patent
Brechbuhl et al.

(10) Patent No.: US 11,726,961 B2
(45) Date of Patent: *Aug. 15, 2023

(54) DYNAMICALLY UPDATING DISTRIBUTED CONTENT OBJECTS

(71) Applicant: Salesforce.com, Inc., San Francisco, CA (US)

(72) Inventors: Brian Brechbuhl, Carmel, IN (US); Daniel Wilson, San Francisco, CA (US); Douglas R. G. White, Carmel, IN (US); Jerry W. Richardson, Westfield, IN (US); Zach Franken, Carmel, IN (US); Kelson Morgan Jones, Indianapolis, IN (US); Elena Carter, Fishers, IN (US); Christopher Dalzell, Indianapolis, IN (US); David Adam Randall, Carmel, IN (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,556

(22) Filed: Aug. 18, 2021

(65) Prior Publication Data
US 2021/0382853 A1     Dec. 9, 2021

Related U.S. Application Data

(63) Continuation of application No. 16/653,545, filed on Oct. 15, 2019, now Pat. No. 11,132,337.

(51) Int. Cl.
*G06F 16/17* (2019.01)
*H04L 67/1097* (2022.01)
(Continued)

(52) U.S. Cl.
CPC ........ *G06F 16/1734* (2019.01); *G06F 16/122* (2019.01); *G06F 16/17* (2019.01);
(Continued)

(58) Field of Classification Search
CPC .... G06F 16/1734; G06F 16/122; G06F 16/17; G06F 16/176; H04L 61/4547; H04L 67/06; H04L 67/1097; G06Q 10/10
See application file for complete search history.

(56) References Cited

U.S. PATENT DOCUMENTS

| 10,949,382 | B2* | 3/2021 | Hammer | G06F 16/13 |
| 2004/0215977 | A1* | 10/2004 | Goodman | H04L 51/212 |
| | | | | 726/22 |

(Continued)

*Primary Examiner* — El Hadji M Sall
(74) *Attorney, Agent, or Firm* — Holland & Hart LLP

(57) ABSTRACT

A document object may be transmitted to a plurality of user devices. The document object may include at least one field for display of a content object of a group of content objects. The field may be associated with an identifier corresponding to the group of content objects. When the document object is accessed, then the access may trigger a request to a server, which may select a content object of the group of content objects using a content object identification function. The content object identification function may be dynamically updated based at least in part on the document object being accessed by one or more of the plurality of user devices. Responsive to the request, a unique content object identifier corresponding to the selected content object may be transmitted to the user device and displayed at the accessed document object.

20 Claims, 10 Drawing Sheets

(51) Int. Cl.
*G06F 16/176* (2019.01)
*G06F 16/11* (2019.01)
*H04L 67/06* (2022.01)
*H04L 61/45* (2022.01)

(52) U.S. Cl.
CPC ........ *G06F 16/176* (2019.01); *H04L 61/4547* (2022.05); *H04L 67/06* (2013.01); *H04L 67/1097* (2013.01)

(56) References Cited

U.S. PATENT DOCUMENTS

2015/0019559 A1* 1/2015 Maquaire .............. G06F 16/907
 707/740
2017/0200122 A1* 7/2017 Edson ................... H04L 63/104

\* cited by examiner

DYNAMICALLY UPDATING DISTRIBUTED CONTENT OBJECTS

CROSS REFERENCE

The present application for patent is a continuation of U.S. patent application Ser. No. 16/653,545 by Brechbuhl et al., entitled "DYNAMICALLY UPDATING DISTRIBUTED CONTENT OBJECTS," filed Oct. 15, 2019, assigned to the assignee hereof, and is expressly incorporated by reference in its entirety herein.

FIELD OF TECHNOLOGY

The present disclosure relates generally to database systems and data processing, and more specifically to dynamically updating distributed content objects.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A/B testing may be used to test different versions of content to determine which versions perform better (e.g., according to engagements). A/B testing may be used to test the engagement with aspects of web pages and emails such as advertisements, product pages, etc. For example, multiple versions of an email content may be deployed to determine which version is the most successful (e.g., has the highest conversion rate). In some systems, a marketing manager may spend time periodically curating the feedback corresponding to different versions, segmenting subscribers in accordance with the feedback, and deploying updated emails/pages based on the feedback and segmentation. These systems may process emails/pages and feedback in a batched manner, which means that the updates to the content may be performed periodically (e.g., every day or week). These batch systems may not account for real-time subscriber behavior and conditions, and may not be dynamically adaptable to new versions of the content being deployed.

DETAILED DESCRIPTION

Figure 1:
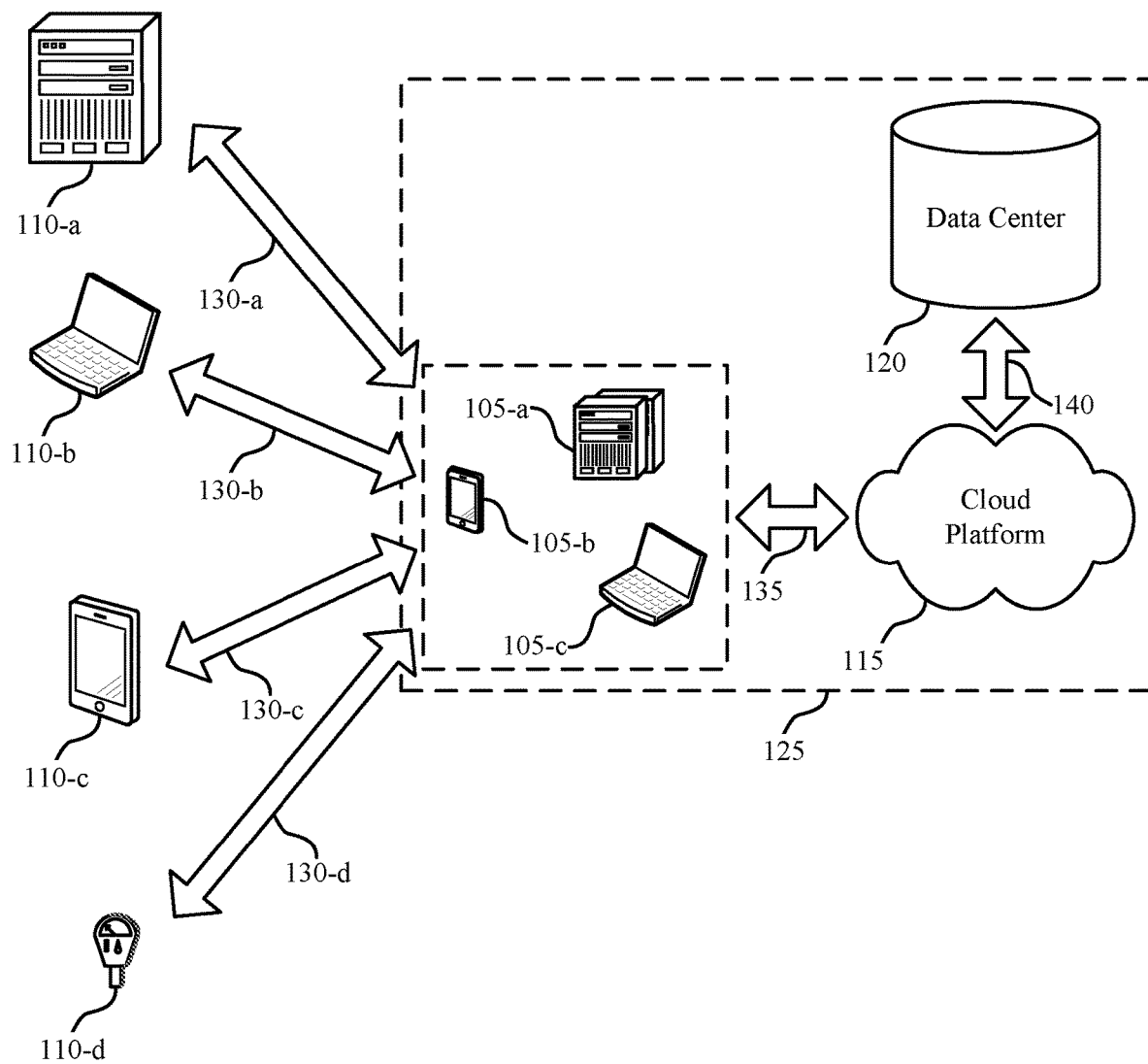
FIG. 1 illustrates an example of a system for data processing that supports dynamically updating distributed content objects in accordance with aspects of the present disclosure.

Aspects of the disclosure described herein provide a solution which monitors real-time feedback with deployed content (e.g., assets or copy), updates a machine learning engine based on the feedback, and updates the deployed content based on the feedback in near real-time using the machine learning engine. For example, an email with different versions of a picture may be transmitted to a subscriber base for advertisement purposes. When users open the email and/or click the picture, the feedback is used to update a machine learning model, and users that subsequently open the email may see pictures that are deployed based on the feedback of the original users. The system uses links (e.g., uniform resource locators (URLs)) to connect various fields of a transmitted email (or a webpage) to a batch of content objects/copy. When a user opens the email, a request is transmitted to the server and the server selects the version to deliver to the user based on the model. Using these and other proposed techniques, the user may not see any (or very little) delay between opening of the email and viewing the delivered content. If the user further clicks the picture, clicks an associated link, does nothing (e.g., closes the email without navigating further), unsubscribes, etc., the feedback is used to update the model, which is then used to deliver content objects to users that open the email at a later time.

A user or administrator of a communication distribution system may configure an email, webpage, advertisement, etc. (collectively a "document object") that may be distributed or accessed by a plurality of users. In some cases, a group of users may be considered subscribers to a service, organization, etc. The document object may be configured with one or more fields that display content objects, such as images, text, links, etc. A group of content objects may be associated with one field. For example, a group of images may be associated with an image field, and upon access of the document object by a user device, one of the group of images may be displayed. To support testing of various content objects of groups, an content object identification function may use feedback associated with user access, interaction, etc. of a document object and included elements (e.g., images, links, buttons). The content object identification function and associated systems and techniques may support dynamic and near real-time testing of content objects, increase in probability of display of well performing content objects, and reduction of probability display of relatively poorly performing content object. These techniques may increase the likelihood of interaction with content.

The document object may be transmitted to a plurality of user devices (e.g., via email). The document object may include at least one field for display of a content object of a group of content objects. The field may be associated with a source identifier corresponding to the group of content objects. When the document object is accessed (e.g., the email is opened by a user), then the access may trigger a request to a server, such as an application server, and the server may select a content object of the group of content objects using the content object identification function and based at least in part on the user identifier associated with the request. Responsive to the request, a unique content object identifier corresponding to the selected content object may be transmitted to the user device and displayed at the accessed document object.

As various users access the document object and interact with the various elements therein, the content object identification function may be updated based on the interaction. For example, if a user opens an email and clicks a link associated with a displayed content object, the content object identification function may be updated such that the displayed content object is more likely to be displayed in subsequent document object accesses. Similarly, if a user opens an email and does not further interact (e.g., does nothing) with the email, then the displayed content objects may be less likely to be displayed in subsequently opened emails. As such, each content object may be associated with a respective engagement metric (e.g., click-to-open rate), which may be used to determine a probability of display.

The content object identification function may utilize an explore process and an exploit process to select a content object from a group. The explore process may select content objects using a semi-random probability. For example, during initial deployment and access of a document object, the content objects may be selected at random. The feedback with the randomly displayed content may be monitored and used to determine engagement metrics associated with each content object. As feedback is collected, the exploit process may be increasingly used, and the exploit process may use the metrics to select the content objects. Thus, the exploit process may select well-performing content objects with greater probability over less well-performing content objects. It should be noted that the exploit process may use a random selection, but with a less random process than that of the explore process. These and other techniques are further described with respect to the figures.

Aspects of the disclosure are initially described in the context of an environment supporting an on-demand database service. Aspects of the disclosure are further described with respect to system diagrams, a send and response flow diagram, and a process flow diagram. Aspects of the disclosure are further illustrated by and described with reference to apparatus diagrams, system diagrams, and flowcharts that relate to dynamically updating distributed content objects.

FIG. 1 illustrates an example of a system 100 for cloud computing that supports dynamically updating distributed content objects in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud platform 115 may support a content distribution engine that distributes document objects (e.g., emails, webpages, etc.), selects content objects for display in the document objects, monitors feedback associated with the document objects by users, and updates an object identification function based on the feedback. The cloud clients 105 may use the content distribution engine to test and distribute various content objects such as to increase the likelihood of positive interaction by users (e.g., contacts 110). For example, a cloud client 105 may utilize the content distribution engine to distribute an email to subscribers (e.g., contacts 110) of the cloud client 105. The engine may dynamically cause display of well performing pieces of content (e.g., text, images, buttons, layouts, etc.) after the email is distributed. Thus, as various contacts 110 open the email, the likelihood of display of a specific piece of content may be changed based on prior interaction by other contacts 110.

Conventional content distribution systems may require a marketing administrator data scientist to review feedback using a batch technique. For example, a batch of emails with different versions of content may be transmitted for a first time period (e.g., a week). As users interact with the email, the administrator may document the feedback and select content for a next batch during a next time period based on the feedback. Thus, the administrator may be required to curate content based on documented feedback and construct various pieces of content and collections for distribution. Because such systems may utilize batch feedback processing, the systems do not account for real-time subscriber behavior and conditions. Further, when a new piece of content is added for distribution, the batch system may need to be readjusted such that the new content may be tested against existing content.

The cloud platform 115 however supports stream processing and real-time content selection based on real-time feedback. The system may be dynamically updated such that well-performing content may be displayed with a higher probability than less well-performing content using, in some cases, up to the minute feedback metrics. Further, content may be selected for display at a user device depending on attribute data associated with user identifiers. This technique further supports increased engagement in that the content may be selected such that the user is more likely to interact with the content (or associated content). In some cases, to support low-latency processing, user/attribute data may be stored in a file system, such that the attribute data may be efficiently queried and processed for content selection. To provide accurate and robust engagement metrics for distributed content, the content distribution engine supported by the cloud platform 115 may also monitor various levels of engagement to determine engagement metrics. For example, engagement metrics for content distributed to a user that clicks through and purchases an item/service may be adjusted with a greater weight than that of engagement metrics for content distributed to a user that only clicks through.

Further, because of the utilization of dynamic linking, the emails may be sent to the recipients, and the content objects are selected and displayed as users open the emails (or navigate to a web-page). Thus, as the first set of recipients open the emails, the interaction by the first set of recipients with the content of the emails may be used to display content in later email opens without needing to send subsequent emails. Additionally, the storage of user and attribute data as a file system provides for low latency, such that when a user opens the email, the user may not perceive a delay between opening and viewing content objects (which are selected in responsive to the user opening the email/web-page).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example, utilization of the content distribution engine described herein, a shoe company may be an example of a cloud client 105. The shoe company may have a list of users or subscribers that receive marketing campaigns such as email campaigns. A marketing administrator may configure a group of ten shoe images that may be distributed to the subscribers. For example, an email (e.g., document object) may be distributed, and the email may include a field for displaying one of the ten shoe images. The email may be distributed, but the field may not be populated with an image until the email is opened. When the email is initially opened by a first set of users, the email may display one of the images selected randomly or semi-randomly. After various users open and interact (e.g., click a link, do nothing, etc.), the feedback is used to update a content selection engine. When subsequent users open the email, the images are displayed based on the prior feedback such as to increase the likelihood of interaction with the email (e.g., increase likelihood that a user activates a link in the email). Further, the shoe company may store subscriber data that may be used for display of the images. For example, if an image is performing well for a certain segment of subscribers (e.g., males under the age of forty), then when a user in that segment subsequently opens the email, then the image may be selected for display. Accordingly, utilization of stream processing, dynamic linking and content selection, user and attribute data, etc. may support increased user engagement with distributed content.

Figure 2:
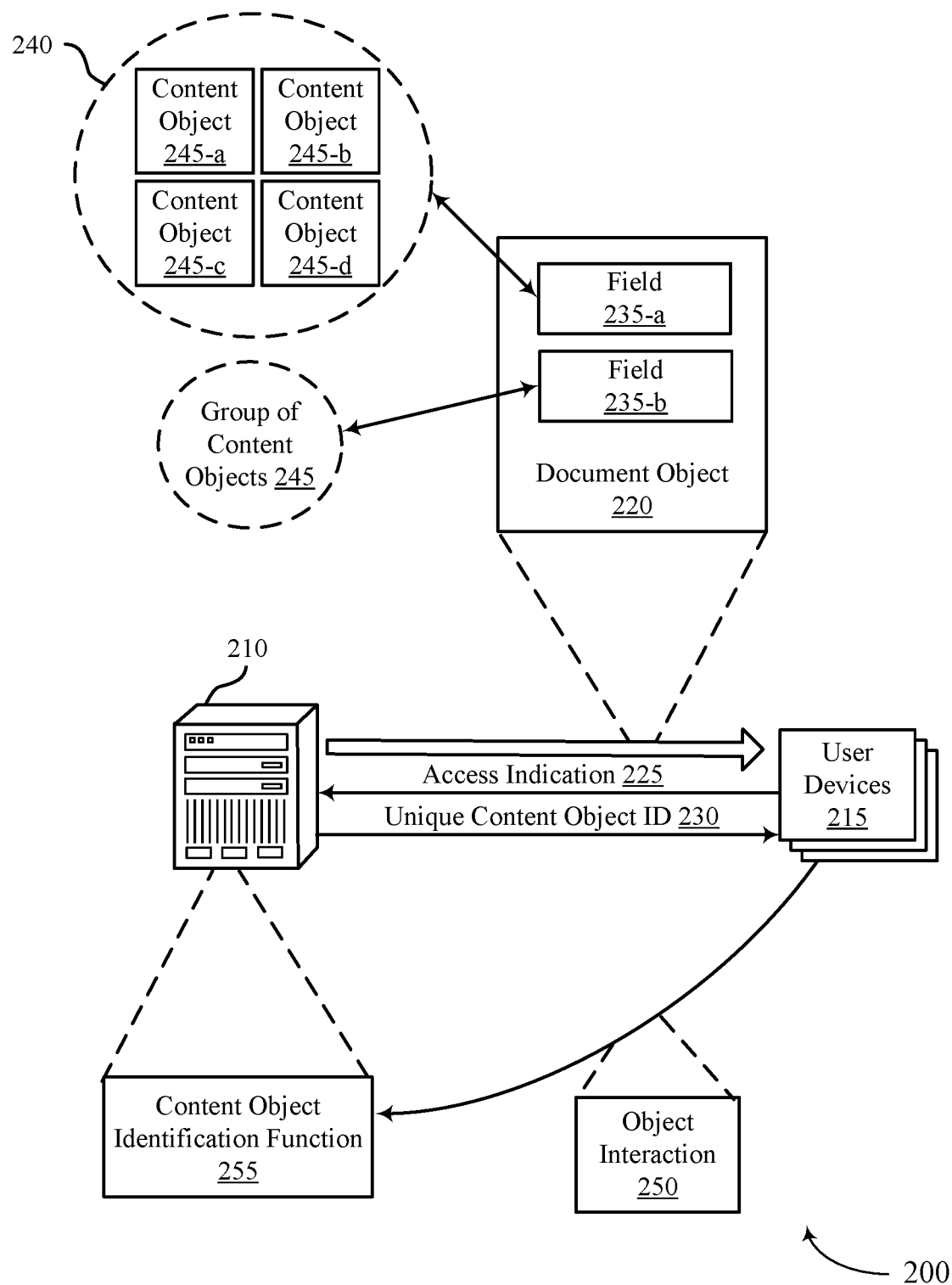
FIG. 2 illustrates an example of a content distribution system that supports dynamically updating distributed content objects in accordance with aspects of the present disclosure.

FIG. 2 illustrates an example of a content distribution system 200 that supports dynamically updating distributed content objects in accordance with aspects of the present disclosure. The content distribution system 200 includes a server 210 and a set of user devices 215. The server 210 may be an example of aspects of the cloud platform 115 of FIG. 1. For example, the server 210 may represent a combination of a data storage and retrieval system, an application server, a communication server, etc. and may be an example of or include aspects of a content distribution engine. The set of user devices 215 may represent client devices such as devices of subscribers (e.g., cloud contacts 110) of a cloud client 105.

An administrator (e.g., of a cloud client 105) may access a user interface supported by the server 210 to configure a document object 220 for distribution to the set of user devices 215. The document object 220 may include instructions (e.g., scripting language, markup language) for displaying a document (e.g., email, webpage, etc.) at user devices 215. For example, the administrator may use the user interface to configure an email for distribution to the user devices 215. The email (e.g., document object 220) may include fields 235 for display of elements such as text, images, links, or other user elements (e.g., buttons, menus, etc.). In some cases, the document object 220 may include static elements (e.g., static text). To support dynamic elements, the fields 235 may be linked to a group of content objects. For example, the field 235-a may be linked to a group 240-a of content objects 245, and the field 235-b may be linked to a group 240-b of content objects. The link between the field 235 and the respective group 240 of content objects may be an example of a source identifier of the group 240. In some cases, the link is represented as a URL or other identifier of the data location at the server 210 storing the content objects.

The server 210 (or associated systems) may distribute the document object 220 to set (or a subset) of the user devices 215. For example, the server 210 may distribute the document object 220 via email to the user devices 215. At the time of distribution, one or more of the fields 235 may not include a content object. Rather, as noted above, the field may include a link identifying the source of an associated group 240 of content objects. These links may be referred to as "open time links." As users of the various user devices 215 access the document object 220 (e.g., open the email), the server 210 may receive an access indication 225 corresponding to each access of the document object 220. For example, as a user opens the email (e.g., the document object 220), the email client at the corresponding user device 215 may trigger a request, such as an application programming interface (API) request, at the server 210. The request may correspond to the document object access indication 225 and may include a source identifier of one or more of the groups 240 of the content objects. In some cases, the document object access indication 225 includes a user identifier corresponding to the user/device opening the document object 220. The document object access indication may also include other metadata such as a timestamp of opening the document object 220, a device type/version, client application type/version, etc.

The server 210 includes a content distribution engine with a content object identification function 255. Responsive to receiving the access indication 225 from one or more of the user devices 215 and including the source identifier corresponding to the group of content objects (e.g., the group), the server 210, using an content object identification function 255, selects one of the content objects 245 from the group 240. During an initial phase, the content object 245 may be selected at random or semi-random. For example, the initial phase (e.g., an explore phase) may be used until a threshold number of access indications 225 are received, until a requisite amount of feedback data is received, during a static time period, etc. During the phase, each content object 245 may have an equal probability of being selected, or the probability of selection may be otherwise pre-determined. It should be noted that other data, such as user attribute data may be considered during this phase.

Accordingly, the content object identification function 255 selects one of the content objects 245 and transmits a unique content object identifier 230 to the user device. The user device receives the unique content object identifier 230 and displays the associated content object 245 in the corresponding field 235-a. Thus, when a user opens the document object 220 (e.g., opens the email) at a use device 215, the access indication 225 (including a source identifier for a group linked to one or more of the fields 235) is transmitted to the server 210, the server 210 selects a content object 245 based at least in part on the access indication 225, and transmits a unique content object identifier 230 to the user device 215. These operations may occur in a short amount of time (e.g., milliseconds), such that the user may not detect a delay in opening the email and the selected content object(s) 245 being displayed.

After a user device 215 opens the document object 220 and views the selected content object 245. The server may monitor further action/inaction at the user device 215. For example, if a user clicks a link included in the document object 220, clicks the selected content object 245, or otherwise interacts with the document object 220, then an object interaction indication 250 may be transmitted to the server 210. That is, the user may activate a link in the document object 220, and the link activation may trigger an object interaction indication 250 being transmitted to the server 210 (e.g., an API request). Further, any further activity by the user (e.g., purchasing an item, adding item to the cart, viewing other items) may be monitored at the server 210 in association with the displayed content object 245. Alternatively, the user may open (e.g., access) the document object 220 but may not further interact with the document object 220 (e.g., the user may close the email without clicking a link). Such inaction may also be monitored by the server 210. Thus, the server 210 may track a click to open ratio associated with each content object 245 of a group 240.

The click to open ratio for each content object 245 may inform the probability of the content object 245 being selected for display after a subsequent access indication 225 transmitted by a user device 215. Thus, as various users open the document object 220 and click (or do nothing) links within the document object 220, interaction metrics associated with the content objects 245 are updated and content objects 245 may be selected for display accordingly. In some cases, the click to open ratio (or other metrics) may be updated on a periodic basis (e.g., every minute), such that the best performing assets (e.g., content objects 245) are selected in near real-time. To update the metrics, the content distribution engine (e.g., the content object identification function 255) may sample the click and open counts in increments and also sample the past metrics. For example, the click and open counts may be sampled in 1 minute increments, and each sample may also document the counts that occurred 2 minutes in the past. That is, every 1 minute, the counts are sampled for the past 2 minutes. This technique accounts for user behavior in which opens and clicks may not occur during the same time period. After the counts are sampled, the metrics associated with each content object of a group may be updated, and the metrics may be used to select the content object in a next interval. In some cases, the metrics may be bound by one or more engagement metric binding rules such that jumps in engagements (e.g., opens) do not cause errors in the object identification process.

The content distribution engine (e.g., the content object identification function 255) may execute an explore process and an exploit process for selecting a content object from a group. As noted earlier, the explore process may be utilize for initial distribution until feedback is received such that the exploit process may be used. The explore process may select content objects semi-randomly (e.g., with an equal distribution), while the exploit process may select content objects while accounting for the engagement metrics. It should be noted that the exploit process may select objects at random, but the probability of selecting a piece of content may be adjusted based on metrics associated with the content. The explore process and the exploit process may be used simultaneously or contemporaneously. For example, the explore process may be used for 20% of the received access indications 225, while the exploit process may be used for 80% of the received access indications 225. The amount range of utilization of the explore process and the exploit process may be adjusted based on the amount of feedback received. As more feedback is received, the exploit process may be used increasingly. For example, if the system detects a variance or spike in response, then the corresponding content may be exploited using the exploit process. Further, if a new piece of content (e.g., an additional content object) is added to a group, then the new content object may be tested using the explore process. Thus, the system may automatically adapt to additional feedback as well as new content.

The content distribution engine may also consider user attributes when selecting a content object for display in the document object 220. For example, an access indication 225 received from a user device 215 may include a user identifier of a user or subscriber associated with the accessing device. The server 210 may store or be configured with access to a datastore with a plurality of user identifiers and attributes associated with the user identifiers. The attributes may include data such as age, gender, web-behavior data, purchase data, segment data, affinity data, etc. Thus, when the access indication 225 includes a user identifier, the server 210 may use attribute data to filter potential content selections from a group of content objects. For example, if one or more content objects have poor engagement metrics for users associated with one or more particular attributes, then such objects may be filtered from the group before the content object is selected.

Other content object selection rules may also be enforced to filter content objects before (or after) object selection. For example, the system may enforce a fatigue rule that controls how many times a user/subscriber is shown a piece of content. Other rules may filter content based on age or other attributes. For example, if a user is under the age of eighteen, then a content object with a credit card offer may be filtered such that it is not displayed to the user.

User and attribute data may be stored in a bifurcated manner. One storage technique may be used for low latency retrieval and processing during object selection. For example, a high performance clustered file storage system may be used to store user identifiers and associated attributes, where a user identifier may correspond to an address for the attribute data. As such, when an access indication 225 including a user identifier is received, then the received user identifier may be used to quickly access the attribute data associated with the user (e.g., because the identifier may correspond to the address of the attribute data). This file storage technique of the attribute data may support a near undetectable (from a human perspective) delay in opening the document and display of the selected content objects. To support the file storage technique, subscriber or user data stored in a database may be processed to generate the file storage system. This processing may occur periodically to keep the file storage system current. Copies of the user/attribute data may also be stored for large batch data processing (e.g., machine learning). In some cases, the attribute data may be updated in response to engagement. For example, if a user clicks a link, purchases an item, or otherwise interacts with a document object 220 or associated content objects, then the attribute data may be updated to reflect such behavior.

To support updating attribute data, an administrator may link attributes, parameters, tags, etc. to the content objects. These tags may characterize the content objects. For example, one image of a shoe may be presented in a rural scenario, while another image of a shoe may be presented in a urban scenario. Tags associated with such images may reflect the presentation scenario. As a user interacts with one of these images, affinity data associated with the user may be updated to reflect an inference of interest in those characteristics.

The techniques described herein may also be used in web-browsing scenarios. A document object 220 may represent a web-page, and the document object 220 may include fields linked to groups of content objects. As a user navigates to a web-page using a web-browsing client, the access indication 225 may be triggered. As described herein, the server 210 may select one or more content objects for display at the web-page, monitor feedback associated with the displayed content objects, and update the content object identification function 255. It these scenarios, the document object 220 may not be transmitted to a plurality of user devices. Rather, the document object 220 may be hosted at a web-server and accessed by the user devices 215. The document objects 220 may be examples of images, text, multi-media, web-page layouts, etc.

In some cases, the content object identification function 255 implements regret minimization processes for object selection. For example, if a particular content object is detected as performing negatively (e.g., relatively low click to open ratio), if an engagement metric associated with a content object drops significantly in a short period of time, etc., then the content object identification function 255 may remove the content object from the selection pool, may drop the selection probability (e.g., to 0 or near 0), etc. In some cases, the object interaction indication 250 may specify whether a user "unsubscribes" to an email or service (or deletes an associated application). Unsubscribes/deletions may be weighted more negatively than an inaction. Thus, if a content object is associated with an increase in unsubscribes/deletions, then the content object identification function 255 may remove the content object from the selection pool or decrease the selection probability.

In some cases, the content object identification function 255 servers to solve aspects of a "multi-armed bandit" problem. That is, initially, each content object may be associated with a "random reward" or a random probability of being associated with positive user interaction (e.g., click-through). Further, since there may be a finite number of sends or finite number of opens or accesses to a document object 220, there is a limited number of resources that may be allocated to maximize interaction. Thus, the content object identification function 255 may be a machine learning model that uses reinforcement learning as well as the explore and exploit process.

Because the model may utilize past performance data (e.g., engagement data) to optimize future performance data, the model may utilize aspects of predictive analytics (e.g., predictive models and/or decisions models). The input to the model may be the past performance data (e.g., clicks, opens, click to open rate, etc.). In some cases, the model may utilize reinforcement learning techniques and regression techniques to assign selection probabilities to various content objects. The model may be implemented as an artificial neural network, decision tree, support vector machine, Bayesian network, genetic algorithm, etc.

To support the multi-armed bandit algorithm (e.g., the content object identification function 255), the system supports stream processing to process opens, selections, click-throughs, etc. The stream processing techniques may be used because the system may expect spikes or increases in activity volume. The results of the stream processing may be periodically updated (e.g., the data stream is sampled) and stored in a database server, such that the results/data may be accessed. That is, the click to open ratios associated with each content object may be stored in a database server. The content object identification function 255 may access the metrics to use in the object selection process (e.g., in the explore and exploit processes). Further, the state of the multi-armed bandit algorithm (e.g., parameters of the machine learning model such as selection probabilities for each content object) may be stored in the database server.

The stream processing may be supported by a distributed/parallelized computing system (e.g., rather than using a transaction database). For example, Hadoop techniques may be used to process the large amounts of event data to support the data used by the bandits of the multi-armed bandit algorithm. As noted, the results of the interaction event processing may be stored in the transactional database for efficient access by the content object identification function 255.

Figure 3:
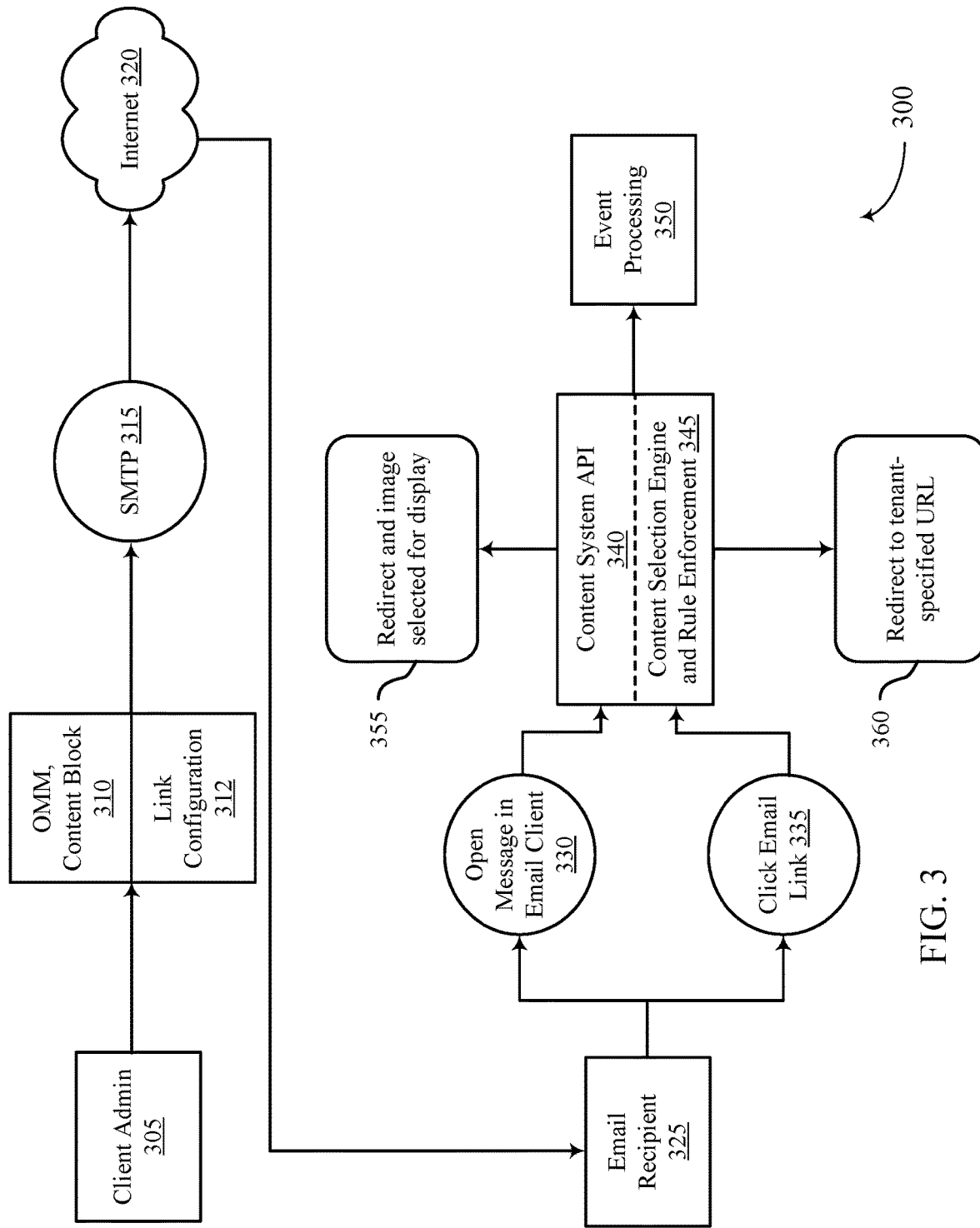
FIG. 3 illustrates an example of a send and response flow diagram that supports dynamically updating distributed content objects in accordance with aspects of the present disclosure.

FIG. 3 illustrates an example of a send and response flow 300 that supports dynamically updating distributed content objects in accordance with aspects of the present disclosure. The send and response flow 300 includes various steps performed by users, systems, and devices. At 305, a client administrator (e.g., a tenant of a cloud platform 115 of FIG. 1) configures a document object including at least one field linked to a group of content objects for distribution to a plurality of user devices. The administrator may configure the content using a user interface supported by a server. The configuration may include linking the document object to a plurality of target subscribers (and associated attributes). This data may be processed by a decision engine. At 310, a content block may be generated by the system, the content block may include instructions defining a document object, links to content objects/groups of content objects and other elements.

At 312, the system generates a link to a document object. The link may include an image source (e.g., href) or source for a group of content objects (e.g., source identifier). The link or source may contain a profile identifier (e.g., user identifier) that may be transmitted back to the server upon activation of a link in the document object. The user identifier and/or link may be encrypted. At 315 and 320, the document objects may be distributed (e.g., over the internet) using a secure mail transfer protocol (SMTP) or other communication protocol.

At 325, the document object may be accessed at a user device. For example, an email recipient (e.g., user) may open the email corresponding to the document object. At 330, upon opening the email, a request (e.g., a document object access indication, which may be an example of an hypertext transfer protocol (HTTP) request) may be triggered at a content system API supported by a server (e.g., the server 210). Responsive to the request received at the API, a content object (e.g., image) is selected at 345 using the content identification function (e.g., machine learning model) for display. The selection process may include enforcement of rules, user attribute retrieval and processing, etc. In some cases, the content objects may be stored at an object storage system hosted by a third party (e.g., Amazon simple storage or S3). Thus, the API may trigger a redirect to a S3 system hosting the content objects. In response to the request, a unique content identifier for a selected image may be transmitted to the user device for display.

At 335, the user may click or otherwise activate a link in the received email. This link activation may be used to update the content identification function (e.g., content selection engine). Further, the user device may be redirected to a tenant specified link (e.g., a link corresponding to a webpage for a product, service, etc.). At 350, the users' behavior may be tracked according to an event processing stream. The event processing stream may be supported by a Kafka interaction event topic stream, a spark interaction event processing system, etc. The events may be used to further update the content selection model. Further systems may log various actions by the system and the users, deduplicate content and other data, etc.

Figure 4:
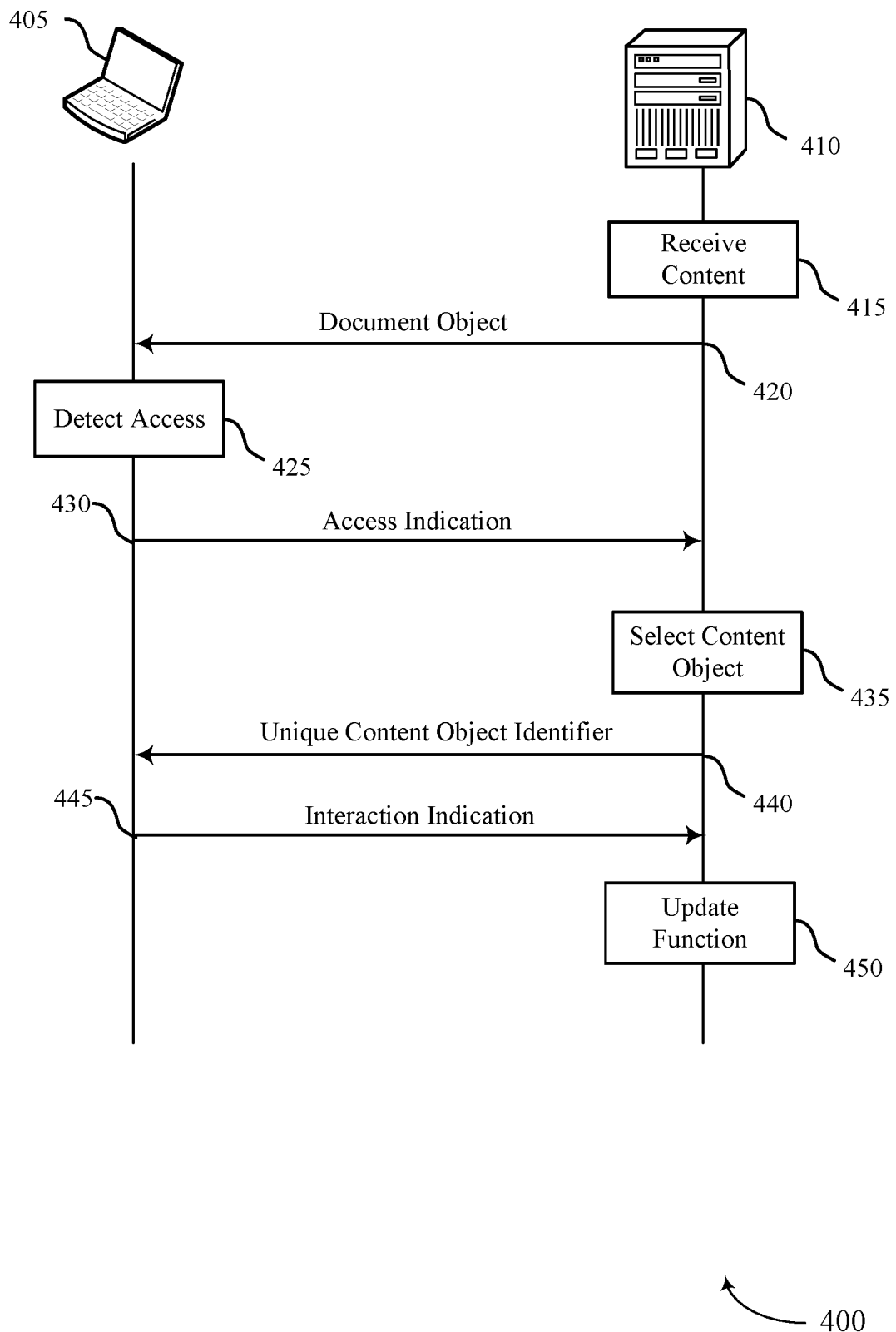
FIG. 4 illustrates an example of a process flow diagram that supports dynamically updating distributed content objects in accordance with aspects of the present disclosure.

FIG. 4 illustrates an example of a process flow diagram 400 that supports dynamically updating distributed content objects in accordance with aspects of the present disclosure. The process flow diagram 400 includes a user device 405 and a server 410. The server 410 may be an example of aspects of the server 210 of FIG. 2 or aspects of the cloud platform 115 of FIG. 1. The user device 405 may be an example of the user devices 215 as described with respect to FIG. 2.

At 415, the server 410 receives content. The received content may include a configuration of a document object (e.g., email, webpage), fields of the document object, and one or more groups of content objects which are associated with the fields. At 420, the server 410 transmits the document object to a plurality of user devices. In some cases, the document object is an email, which is distributed using email distribution techniques. The document object includes a field for display of content objects of a group of content objects. Each content object of the group may be associated with a unique content object identifier.

At 425, the user device 405 (e.g., a client side application) detects access to the document object. The access may correspond to a user opening an email, a user navigating to a web-page corresponding to the document object, etc. The access to the document object may trigger a document object access indication being transmitted to the server 410. Thus, at 430, the server 410 receives the document object access indication from a user device of the plurality of user devices. The document object access indication may include the source identifier corresponding to the group of content objects and a user identifier. The document object access indication may correspond to an API request.

At 435, the server 410 selects, using a content object identification function, a content object of the group of content objects based at least in part on the user identifier and the document object access indication, wherein the content object identification function is dynamically updated based at least in part on the document object being accessed by one or more of the plurality of user devices. In some cases, the content object identification function comprises a machine learning model that is dynamically updated based on user interaction with the distributed document object. The content object identification function may utilize an explore and exploit process for selecting the content object.

At 440, the server 410 transmits, to the user device 405, the unique content object identifier corresponding to the selected content object for display of the selected content object in the document object activated at the user device.

At 445, the server 410 receives, from the user device 405, an interaction indication that corresponds to the unique content object identifier. For example, if a user clicks a link in the document object, then the clicking of the link may trigger the interaction indication which specifies the selected and displayed content object. At 450, the server 410 updates the content object identification function based at least in part on the interaction indication.

Figure 5:
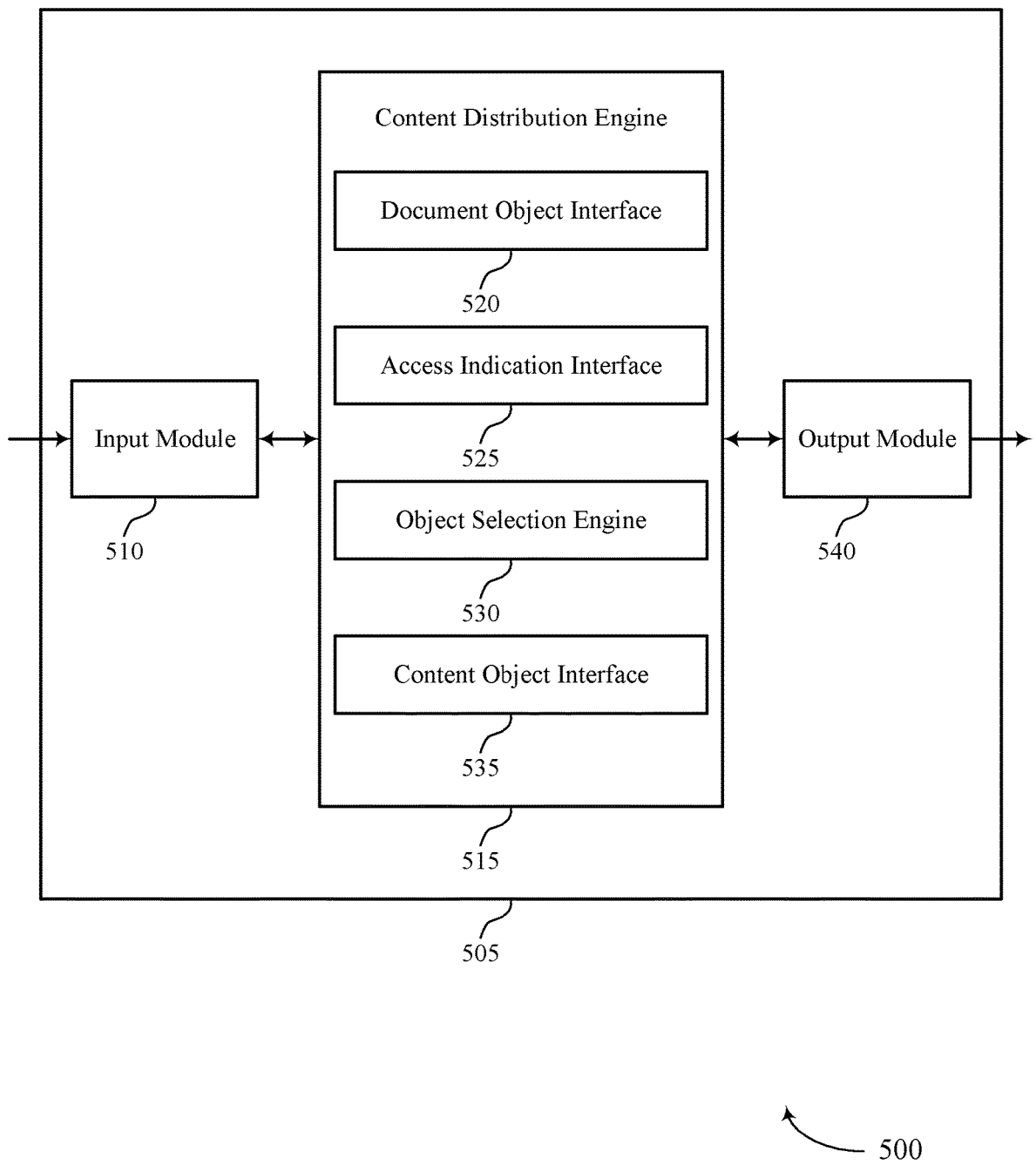
FIG. 5 shows a block diagram of an apparatus that supports dynamically updating distributed content objects in accordance with aspects of the present disclosure.

FIG. 5 shows a block diagram 500 of an apparatus 505 that supports dynamically updating distributed content objects in accordance with aspects of the present disclosure. The apparatus 505 may include an input module 510, a content distribution engine 515, and an output module 540. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the content distribution engine 515 to support aspects described herein. In some cases, the input module 510 may be a component of an input/output (I/O) controller 715 as described with reference to FIG. 7.

The content distribution engine 515 may include a document object interface 520, an access indication interface 525, an object selection engine 530, and a content object interface 535. The content distribution engine 515 may be an example of aspects of the content distribution engine 605 or 710 described with reference to FIGS. 6 and 7.

The content distribution engine 515 and/or at least some of its various sub-components may be implemented in hardware, software executed by a processor, firmware, or any combination thereof. If implemented in software executed by a processor, the functions of the content distribution engine 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The content distribution engine 515 and/or at least some of its various sub-components may be physically located at various positions, including being distributed such that portions of functions are implemented at different physical locations by one or more physical devices. In some examples, the content distribution engine 515 and/or at least some of its various sub-components may be a separate and distinct component in accordance with various aspects of the present disclosure. In other examples, the content distribution engine 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The document object interface 520 may transmit, to a set of user devices, a document object with a field for display of a content object of a group of content objects, where the field is associated with a source identifier corresponding to the group of content objects, where each content object of the group of content objects is associated with a unique content object identifier.

The access indication interface 525 may receive a document object access indication from a user device of the set of user devices, where the document object access indication includes the source identifier and a user identifier, where the document object access indication corresponds to access of the document object at the user device.

The object selection engine 530 may select, using a content object identification function, a content object of the group of content objects based on the user identifier and the document object access indication, where the content object identification function is dynamically updated based on the document object being accessed by one or more of the set of user devices.

The content object interface 535 may transmit, to the user device, the unique content object identifier corresponding to the selected content object for display of the selected content object in the document object activated at the user device.

The output module 540 may manage output signals for the apparatus 505. For example, the output module 540 may receive signals from other components of the apparatus 505, such as the content distribution engine 515, and may transmit these signals to other components or devices. In some specific examples, the output module 540 may transmit output signals for display in a user interface, for storage in a database or data store, for further processing at a server or server cluster, or for any other processes at any number of devices or systems. In some cases, the output module 540 may be a component of an I/O controller 715 as described with reference to FIG. 7.

Figure 6:
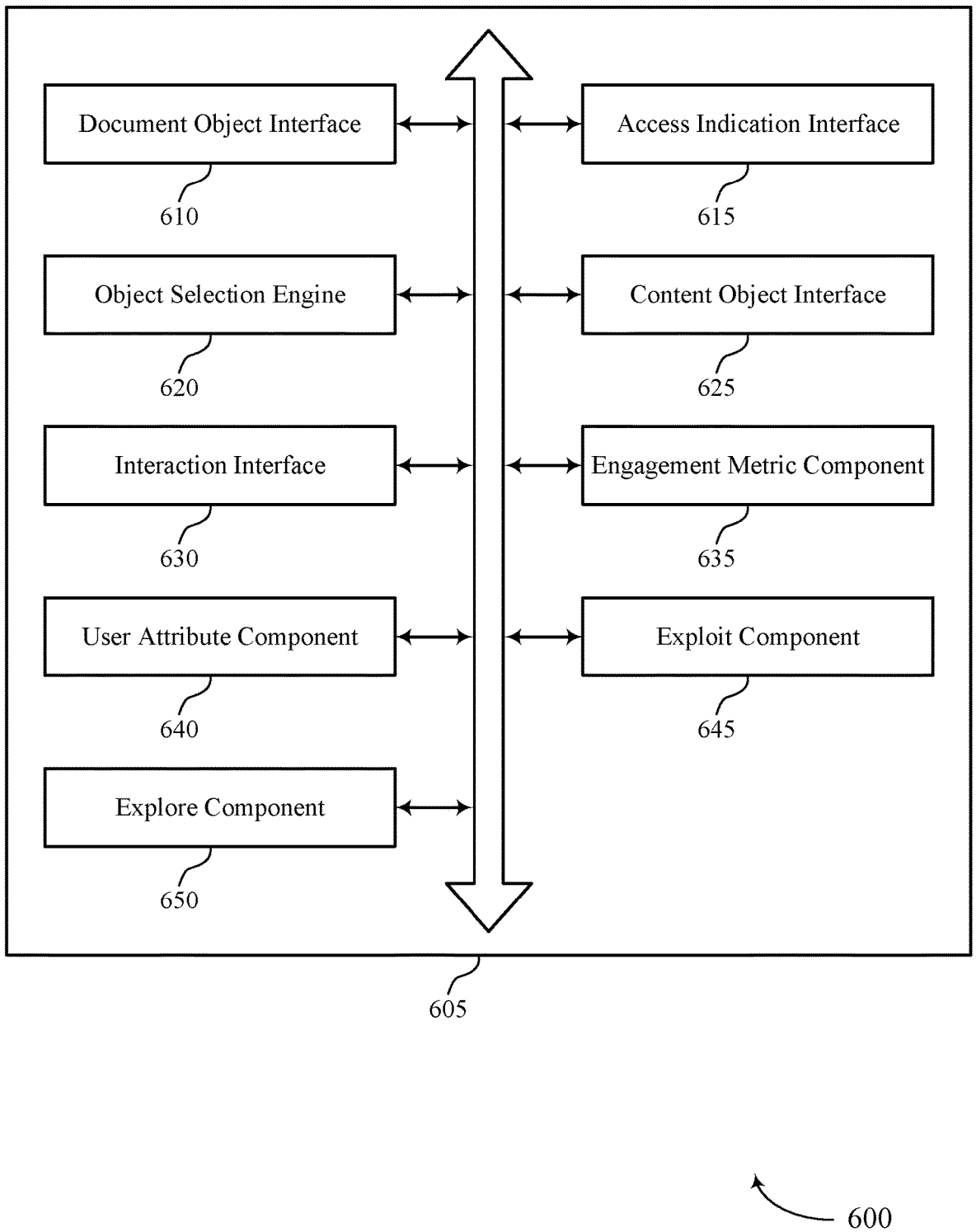
FIG. 6 shows a block diagram of a content distribution engine that supports dynamically updating distributed content objects in accordance with aspects of the present disclosure.

FIG. 6 shows a block diagram 600 of a content distribution engine 605 that supports dynamically updating distributed content objects in accordance with aspects of the present disclosure. The content distribution engine 605 may be an example of aspects of a content distribution engine 515 or a content distribution engine 710 described herein. The content distribution engine 605 may include a document object interface 610, an access indication interface 615, an object selection engine 620, a content object interface 625, an interaction interface 630, an engagement metric component 635, an user attribute component 640, an exploit component 645, and an explore component 650. Each of these modules may communicate, directly or indirectly, with one another (e.g., via one or more buses).

The document object interface 610 may transmit, to a set of user devices, a document object with a field for display of a content object of a group of content objects, where the field is associated with a source identifier corresponding to the group of content objects, where each content object of the group of content objects is associated with a unique content object identifier.

The access indication interface 615 may receive a document object access indication from a user device of the set of user devices, where the document object access indication includes the source identifier and a user identifier, where the document object access indication corresponds to access of the document object at the user device.

The object selection engine 620 may select, using a content object identification function, a content object of the group of content objects based on the user identifier and the document object access indication, where the content object identification function is dynamically updated based on the document object being accessed by one or more of the set of user devices.

In some examples, the object selection engine 620 may update the content object identification function based on the interaction indication and the set of attributes associated with the user identifier.

In some examples, the object selection engine 620 may select, using the updated content object identification function, a second content object of the group of content objects.

In some examples, the object selection engine 620 may transmit, to the user device, the unique content object identifier corresponding to the selected second content object for display of the selected content object in the document object activated at the second user device.

In some examples, the object selection engine 620 may update the content object identification function by reducing a probability of transmitting the content object based on the negative engagement metric.

In some examples, the object selection engine 620 may update a probability of selecting one or more of the group of content objects using the content object identification function.

In some examples, the object selection engine 620 may use an exploit process or an explore process of the content object identification function to select the content object for transmission to one or more of the set of user devices, where the explore process selects the content object based on a semi-random probability and where the exploit process selects the content object based on interaction metrics associated with the group of content objects.

In some examples, the object selection engine 620 may dynamically update the content object identification function based on a click-to-open rate associated with the document object.

In some examples, the object selection engine 620 may filter one or more content objects from the group of content objects based on one or more object selection rules.

In some cases, the one or more object selection rules are based on a transmission count associated with the group of content objects, an attribute of the set of attributes associated with the user identifier, or a combination thereof.

The content object interface 625 may transmit, to the user device, the unique content object identifier corresponding to the selected content object for display of the selected content object in the document object activated at the user device.

In some examples, the content object interface 625 may receive an additional content object for the group of content objects.

The interaction interface 630 may receive, from the user device, an interaction indication corresponding to the unique content object identifier.

In some examples, the interaction interface 630 may receive, from a second user device of the set of user devices, a second document object access indication.

In some examples, the interaction interface 630 may receive the interaction indication specifying whether a user of the user device accessed the document object, activated a link in the document object, unsubscribed to service, or a combination thereof.

The engagement metric component 635 may determine a negative engagement metric associated with the unique content object identifier based on inaction by one or more of the set of user devices.

The user attribute component 640 may update one or more of the set of attributes associated with the user identifier based on receiving the interaction indication.

In some cases, a set of user identifiers associated with the set of user devices are stored using a file storage system, where each user identifier of the set of user identifiers is associated with a set of attributes.

The exploit component 645 may use the exploit process for selecting the content object for one or more of the set of user devices after an interaction condition is satisfied, where the interaction condition is based on an amount of interaction received, an interaction metric associated with one or more of the group of content objects, or a combination thereof.

In some examples, the exploit component 645 may use the exploit process for selecting a content object for transmission to a second set of the set of user devices that access the document object, where the first set is different from the second set.

In some cases, the exploit process uses a semi-random probability that is less random than the semi-random probability used by the explore process.

The explore component 650 may use the explore process for selecting the content objects for transmission to a first set of the set of user devices that access the document object.

In some examples, the explore component 650 may use the explore process for selecting the content object of the group of content objects including the additional content object.

Figure 7:
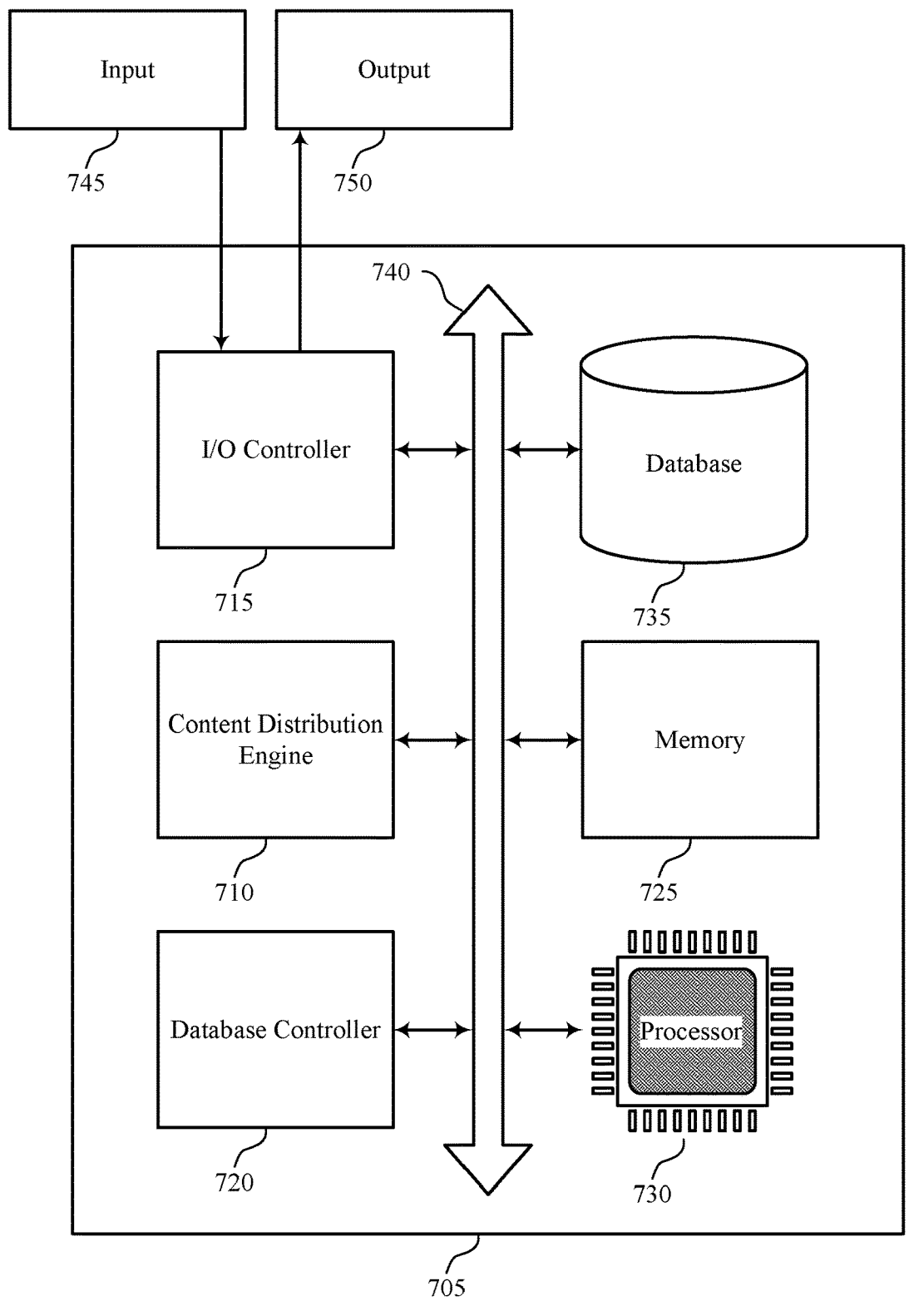
FIG. 7 shows a diagram of a system including a device that supports dynamically updating distributed content objects in accordance with aspects of the present disclosure.

FIG. 7 shows a diagram of a system 700 including a device 705 that supports dynamically updating distributed content objects in accordance with aspects of the present disclosure. The device 705 may be an example of or include the components of an application server or an apparatus 505 as described herein. The device 705 may include components for bi-directional data communications including components for transmitting and receiving communications, including a content distribution engine 710, an I/O controller 715, a database controller 720, memory 725, a processor 730, and a database 735. These components may be in electronic communication via one or more buses (e.g., bus 740).

The content distribution engine 710 may be an example of a content distribution engine 515 or 605 as described herein. For example, the content distribution engine 710 may perform any of the methods or processes described above with reference to FIGS. 5 and 6. In some cases, the content distribution engine 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting dynamically updating distributed content objects).

Figure 8:
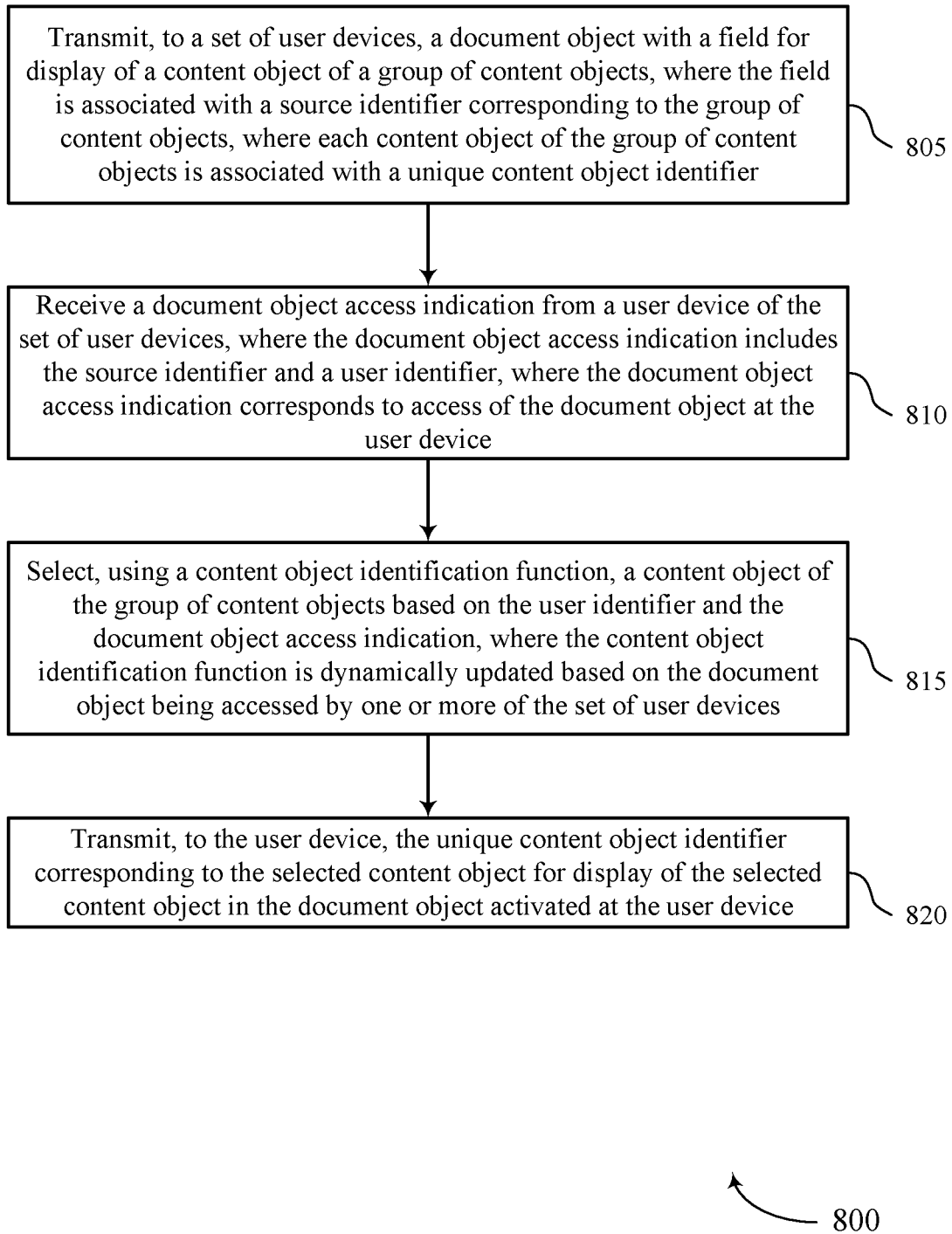
FIGS. 8 through 10 show flowcharts illustrating methods that support dynamically updating distributed content objects in accordance with aspects of the present disclosure.

FIG. 8 shows a flowchart illustrating a method 800 that supports dynamically updating distributed content objects in accordance with aspects of the present disclosure. The operations of method 800 may be implemented by an application server or its components as described herein. For example, the operations of method 800 may be performed by a content distribution engine as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 805, the application server may transmit, to a set of user devices, a document object with a field for display of a content object of a group of content objects, where the field is associated with a source identifier corresponding to the group of content objects, where each content object of the group of content objects is associated with a unique content object identifier. The operations of 805 may be performed according to the methods described herein. In some examples, aspects of the operations of 805 may be performed by a document object interface as described with reference to FIGS. 5 through 7.

At 810, the application server may receive a document object access indication from a user device of the set of user devices, where the document object access indication includes the source identifier and a user identifier, where the document object access indication corresponds to access of the document object at the user device. The operations of 810 may be performed according to the methods described herein. In some examples, aspects of the operations of 810 may be performed by an access indication interface as described with reference to FIGS. 5 through 7.

At 815, the application server may select, using a content object identification function, a content object of the group of content objects based on the user identifier and the document object access indication, where the content object identification function is dynamically updated based on the document object being accessed by one or more of the set of user devices. The operations of 815 may be performed according to the methods described herein. In some examples, aspects of the operations of 815 may be performed by an object selection engine as described with reference to FIGS. 5 through 7.

At 820, the application server may transmit, to the user device, the unique content object identifier corresponding to the selected content object for display of the selected content object in the document object activated at the user device. The operations of 820 may be performed according to the methods described herein. In some examples, aspects of the operations of 820 may be performed by a content object interface as described with reference to FIGS. 5 through 7.

Figure 9:
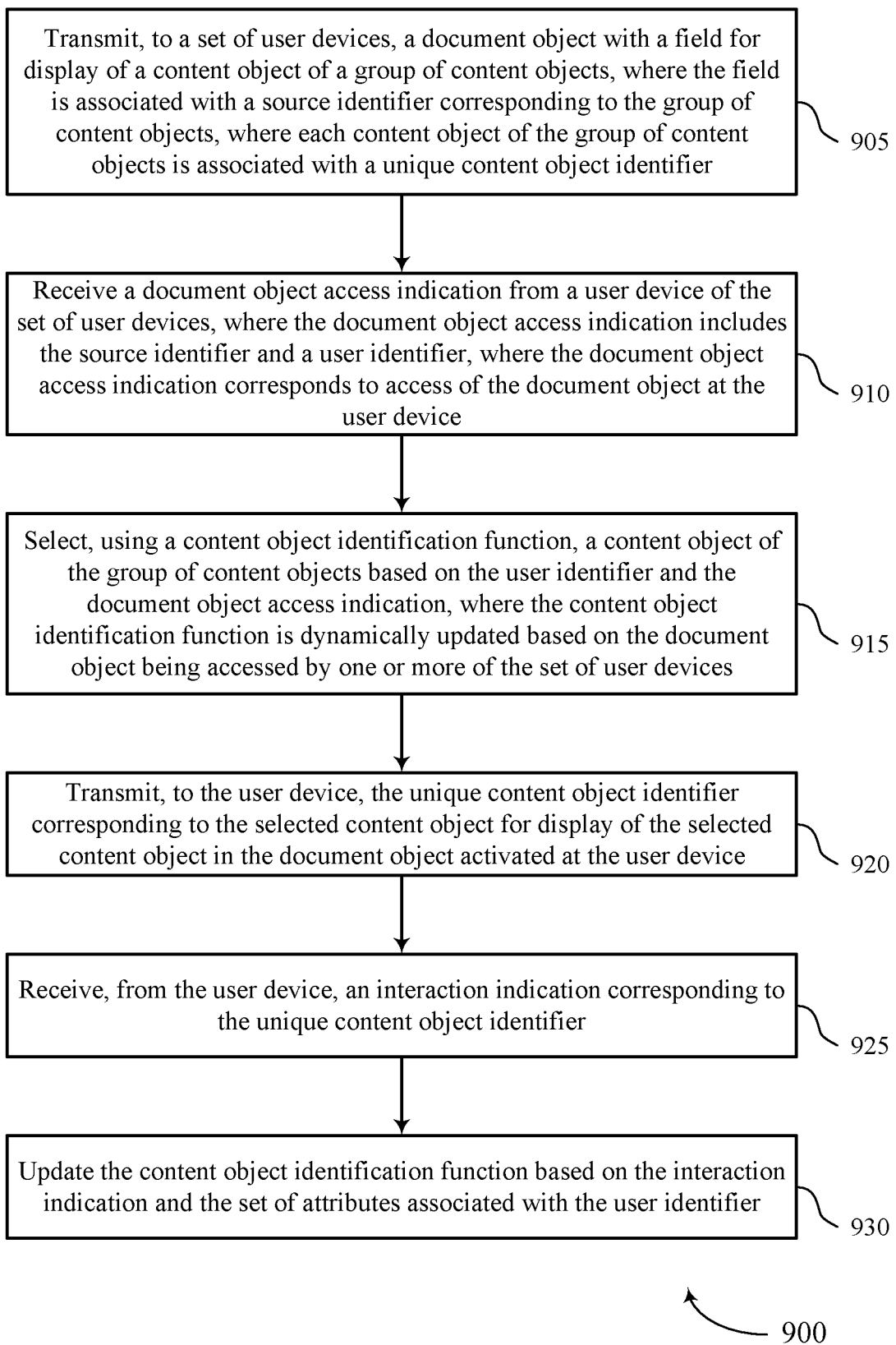

FIG. 9 shows a flowchart illustrating a method 900 that supports dynamically updating distributed content objects in accordance with aspects of the present disclosure. The operations of method 900 may be implemented by an application server or its components as described herein. For example, the operations of method 900 may be performed by a content distribution engine as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 905, the application server may transmit, to a set of user devices, a document object with a field for display of a content object of a group of content objects, where the field is associated with a source identifier corresponding to the group of content objects, where each content object of the group of content objects is associated with a unique content object identifier. The operations of 905 may be performed according to the methods described herein. In some examples, aspects of the operations of 905 may be performed by a document object interface as described with reference to FIGS. 5 through 7.

At 910, the application server may receive a document object access indication from a user device of the set of user devices, where the document object access indication includes the source identifier and a user identifier, where the document object access indication corresponds to access of the document object at the user device. The operations of 910 may be performed according to the methods described herein. In some examples, aspects of the operations of 910 may be performed by an access indication interface as described with reference to FIGS. 5 through 7.

At 915, the application server may select, using a content object identification function, a content object of the group of content objects based on the user identifier and the document object access indication, where the content object identification function is dynamically updated based on the document object being accessed by one or more of the set of user devices. The operations of 915 may be performed according to the methods described herein. In some examples, aspects of the operations of 915 may be performed by an object selection engine as described with reference to FIGS. 5 through 7.

At 920, the application server may transmit, to the user device, the unique content object identifier corresponding to the selected content object for display of the selected content object in the document object activated at the user device. The operations of 920 may be performed according to the methods described herein. In some examples, aspects of the operations of 920 may be performed by a content object interface as described with reference to FIGS. 5 through 7.

At 925, the application server may receive, from the user device, an interaction indication corresponding to the unique content object identifier. The operations of 925 may be performed according to the methods described herein. In some examples, aspects of the operations of 925 may be performed by an interaction interface as described with reference to FIGS. 5 through 7.

At 930, the application server may update the content object identification function based on the interaction indication and the set of attributes associated with the user identifier. The operations of 930 may be performed according to the methods described herein. In some examples, aspects of the operations of 930 may be performed by an object selection engine as described with reference to FIGS. 5 through 7.

Figure 10:
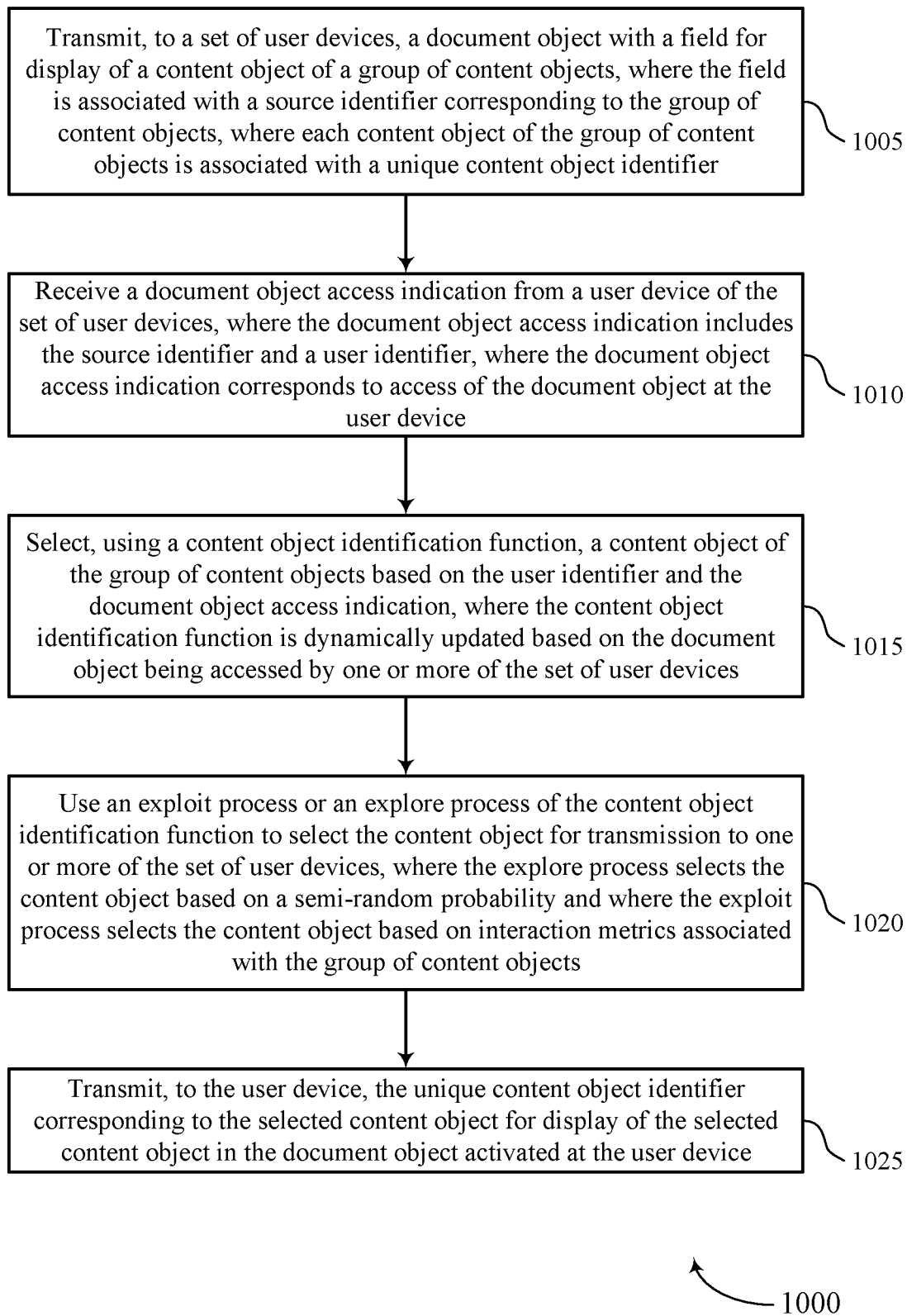

FIG. 10 shows a flowchart illustrating a method 1000 that supports dynamically updating distributed content objects in accordance with aspects of the present disclosure. The operations of method 1000 may be implemented by an application server or its components as described herein. For example, the operations of method 1000 may be performed by a content distribution engine as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 1005, the application server may transmit, to a set of user devices, a document object with a field for display of a content object of a group of content objects, where the field is associated with a source identifier corresponding to the group of content objects, where each content object of the group of content objects is associated with a unique content object identifier. The operations of 1005 may be performed according to the methods described herein. In some examples, aspects of the operations of 1005 may be performed by a document object interface as described with reference to FIGS. 5 through 7.

At 1010, the application server may receive a document object access indication from a user device of the set of user devices, where the document object access indication includes the source identifier and a user identifier, where the document object access indication corresponds to access of the document object at the user device. The operations of 1010 may be performed according to the methods described herein. In some examples, aspects of the operations of 1010 may be performed by an access indication interface as described with reference to FIGS. 5 through 7.

At 1015, the application server may select, using a content object identification function, a content object of the group of content objects based on the user identifier and the document object access indication, where the content object identification function is dynamically updated based on the document object being accessed by one or more of the set of user devices. The operations of 1015 may be performed according to the methods described herein. In some examples, aspects of the operations of 1015 may be performed by an object selection engine as described with reference to FIGS. 5 through 7.

At 1020, the application server may use an exploit process or an explore process of the content object identification function to select the content object for transmission to one or more of the set of user devices, where the explore process selects the content object based on a semi-random probability and where the exploit process selects the content object based on interaction metrics associated with the group of content objects. The operations of 1020 may be performed according to the methods described herein. In some examples, aspects of the operations of 1020 may be performed by an object selection engine as described with reference to FIGS. 5 through 7.

At 1025, the application server may transmit, to the user device, the unique content object identifier corresponding to the selected content object for display of the selected content object in the document object activated at the user device. The operations of 1025 may be performed according to the methods described herein. In some examples, aspects of the operations of 1025 may be performed by a content object interface as described with reference to FIGS. 5 through 7.

A method is described. The method may include transmitting, to a set of user devices, a document object with a field for display of a content object of a group of content objects, where the field is associated with a source identifier corresponding to the group of content objects, where each content object of the group of content objects is associated with a unique content object identifier, receiving a document object access indication from a user device of the set of user devices, where the document object access indication includes the source identifier and a user identifier, where the document object access indication corresponds to access of the document object at the user device, selecting, using a content object identification function, a content object of the group of content objects based on the user identifier and the document object access indication, where the content object identification function is dynamically updated based on the document object being accessed by one or more of the set of user devices, and transmitting, to the user device, the unique content object identifier corresponding to the selected content object for display of the selected content object in the document object activated at the user device.

An apparatus is described. The apparatus may include a processor, memory coupled with the processor, and instructions stored in the memory. The instructions may be executable by the processor to cause the apparatus to transmit, to a set of user devices, a document object with a field for display of a content object of a group of content objects, where the field is associated with a source identifier corresponding to the group of content objects, where each content object of the group of content objects is associated with a unique content object identifier, receive a document object access indication from a user device of the set of user devices, where the document object access indication includes the source identifier and a user identifier, where the document object access indication corresponds to access of the document object at the user device, select, using a content object identification function, a content object of the group of content objects based on the user identifier and the document object access indication, where the content object identification function is dynamically updated based on the document object being accessed by one or more of the set of user devices, and transmit, to the user device, the unique content object identifier corresponding to the selected content object for display of the selected content object in the document object activated at the user device.

Another apparatus is described. The apparatus may include means for transmitting, to a set of user devices, a document object with a field for display of a content object of a group of content objects, where the field is associated with a source identifier corresponding to the group of content objects, where each content object of the group of content objects is associated with a unique content object identifier, receiving a document object access indication from a user device of the set of user devices, where the document object access indication includes the source identifier and a user identifier, where the document object access indication corresponds to access of the document object at the user device, selecting, using a content object identification function, a content object of the group of content objects based on the user identifier and the document object access indication, where the content object identification function is dynamically updated based on the document object being accessed by one or more of the set of user devices, and transmitting, to the user device, the unique content object identifier corresponding to the selected content object for display of the selected content object in the document object activated at the user device.

A non-transitory computer-readable medium storing code is described. The code may include instructions executable by a processor to transmit, to a set of user devices, a document object with a field for display of a content object of a group of content objects, where the field is associated with a source identifier corresponding to the group of content objects, where each content object of the group of content objects is associated with a unique content object identifier, receive a document object access indication from a user device of the set of user devices, where the document object access indication includes the source identifier and a user identifier, where the document object access indication corresponds to access of the document object at the user device, select, using a content object identification function, a content object of the group of content objects based on the user identifier and the document object access indication, where the content object identification function is dynamically updated based on the document object being accessed by one or more of the set of user devices, and transmit, to the user device, the unique content object identifier corresponding to the selected content object for display of the selected content object in the document object activated at the user device.

Some examples of the method, apparatuses, and non-transitory computer-readable medium described herein may further include operations, features, means, or instructions for receiving, from the user device, an interaction indication corresponding to the unique content object identifier, and updating the content object identification function based on the interaction indication and the set of attributes associated with the user identifier.

Some examples of the method, apparatuses, and non-transitory computer-readable medium described herein may further include operations, features, means, or instructions for receiving, from a second user device of the set of user devices, a second document object access indication, selecting, using the updated content object identification function, a second content object of the group of content objects, and transmitting, to the user device, the unique content object identifier corresponding to the selected second content object for display of the selected content object in the document object activated at the second user device.

Some examples of the method, apparatuses, and non-transitory computer-readable medium described herein may further include operations, features, means, or instructions for determining a negative engagement metric associated with the unique content object identifier based on inaction by one or more of the set of user devices, and updating the content object identification function by reducing a probability of transmitting the content object based on the negative engagement metric.

Some examples of the method, apparatuses, and non-transitory computer-readable medium described herein may further include operations, features, means, or instructions for updating one or more of the set of attributes associated with the user identifier based on receiving the interaction indication.

In some examples of the method, apparatuses, and non-transitory computer-readable medium described herein, updating the content object identification function may include operations, features, means, or instructions for updating a probability of selecting one or more of the group of content objects using the content object identification function.

Some examples of the method, apparatuses, and non-transitory computer-readable medium described herein may further include operations, features, means, or instructions for receiving the interaction indication specifying whether a user of the user device accessed the document object, activated a link in the document object, unsubscribed to service, or a combination thereof.

In some examples of the method, apparatuses, and non-transitory computer-readable medium described herein, selecting the content object further may include operations, features, means, or instructions for using an exploit process or an explore process of the content object identification function to select the content object for transmission to one or more of the set of user devices, where the explore process selects the content object based on a semi-random probability and where the exploit process selects the content object based on interaction metrics associated with the group of content objects.

Some examples of the method, apparatuses, and non-transitory computer-readable medium described herein may further include operations, features, means, or instructions for using the exploit process for selecting the content object for one or more of the set of user devices after an interaction condition may be satisfied, where the interaction condition may be based on an amount of interaction received, an interaction metric associated with one or more of the group of content objects, or a combination thereof.

Some examples of the method, apparatuses, and non-transitory computer-readable medium described herein may further include operations, features, means, or instructions for using the explore process for selecting the content objects for transmission to a first set of the set of user devices that access the document object, and using the exploit process for selecting a content object for transmission to a second set of the set of user devices that access the document object, where the first set may be different from the second set.

In some examples of the method, apparatuses, and non-transitory computer-readable medium described herein, the exploit process uses a semi-random probability that may be less random than the semi-random probability uses by the explore process.

Some examples of the method, apparatuses, and non-transitory computer-readable medium described herein may further include operations, features, means, or instructions for receiving an additional content object for the group of content objects, and using the explore process for selecting the content object of the group of content objects including the additional content object.

Some examples of the method, apparatuses, and non-transitory computer-readable medium described herein may further include operations, features, means, or instructions for dynamically updating the content object identification function based on a click-to-open rate associated with the document object.

Some examples of the method, apparatuses, and non-transitory computer-readable medium described herein may further include operations, features, means, or instructions for filtering one or more content objects from the group of content objects based on one or more object selection rules.

In some examples of the method, apparatuses, and non-transitory computer-readable medium described herein, the one or more object selection rules may be based on a transmission count associated with the group of content objects, an attribute of the set of attributes associated with the user identifier, or a combination thereof.

In some examples of the method, apparatuses, and non-transitory computer-readable medium described herein, a set of user identifiers associated with the set of user devices may be stored using a file storage system, where each user identifier of the set of user identifiers may be associated with a set of attributes.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   transmitting, to a plurality of user devices, a document object with a field for display of a content object of a group of content objects;
   receiving a document object access indication from a user device of the plurality of user devices wherein the document object access indication corresponds to access of the document object at the user device;
selecting, using a content object identification function, the content object of the group of content objects based at least in part on the document object access indication, wherein the content object identification function is dynamically updated based at least in part on the document object being accessed by one or more of the plurality of user devices; and
transmitting, to the user device, an indication of the selected content object for display of the selected content object in the document object accessed at the user device.

2. The method of claim 1, further comprising:
receiving, from the user device, an interaction indication corresponding to a unique content object identifier associated with the content object; and
updating the content object identification function based at least in part on the interaction indication.

3. The method of claim 2, wherein the user device is a first user device further comprising:
receiving, from a second user device of the plurality of user devices, a second document object access indication;
selecting, using the updated content object identification function, a second content object of the group of content objects; and
transmitting, to the user device, a unique content object identifier corresponding to the selected second content object for display of the selected content object in the document object activated at the second user device.

4. The method of claim 2, further comprising:
determining a negative engagement metric associated with the unique content object identifier based at least in part on inaction by one or more of the plurality of user devices; and
updating the content object identification function by reducing a probability of transmitting the content object based at least in part on the negative engagement metric.

5. The method of claim 2, further comprising:
updating one or more of a plurality of attributes associated with a user identifier associated with the user device based at least in part on receiving the interaction indication.

6. The method of claim 2, wherein updating the content object identification function comprises:
updating a probability of selecting one or more of the group of content objects using the content object identification function.

7. The method of claim 2, further comprising:
receiving the interaction indication specifying whether a user of the user device accessed the document object, activated a link in the document object, unsubscribed to service, or a combination thereof.

8. The method of claim 1, wherein selecting the content object further comprises using an exploit process or an explore process of the content object identification function to select the content object for transmission to one or more of the plurality of user devices, wherein the explore process selects the content object based at least in part on a semi-random probability and wherein the exploit process selects the content object based at least in part on interaction metrics associated with the group of content objects.

9. The method of claim 8, further comprising:
using the exploit process for selecting the content object for one or more of the plurality of user devices after an interaction condition is satisfied, wherein the interaction condition is based at least in part on an amount of interaction received, an interaction metric associated with one or more of the group of content objects, or a combination thereof.

10. The method of claim 8, further comprising:
using the explore process for selecting the content object for transmission to a first set of the plurality of user devices that access the document object; and
using the exploit process for selecting a second content object for transmission to a second set of the plurality of user devices that access the document object, wherein the first set is different from the second set.

11. The method of claim 8, wherein the exploit process uses a semi-random probability that is less random than the semi-random probability used by the explore process.

12. The method of claim 8, further comprising:
receiving an additional content object for the group of content objects; and
using the explore process for selecting the content object of the group of content objects including the additional content object.

13. The method of claim 1, further comprising:
dynamically updating the content object identification function based at least in part on a click-to-open rate associated with the document object.

14. The method of claim 1, further comprising:
filtering one or more content objects from the group of content objects based at least in part on one or more object selection rules.

15. The method of claim 14, wherein the one or more object selection rules are based at least in part on a transmission count associated with the group of content objects, an attribute of a plurality of attributes associated with a user identifier associated with the user device, or a combination thereof.

16. The method of claim 1, wherein:
a plurality of user identifiers associated with the plurality of user devices are stored using a file storage system,
each user identifier of the plurality of user identifiers is associated with a plurality of attributes in the file storage system.

17. An apparatus, comprising:
a processor;
memory coupled with the processor; and
instructions stored in the memory and executable by the processor to cause the apparatus to:
transmit, to a plurality of user devices, a document object with a field for display of a content object of a group of content objects;
receive a document object access indication from a user device of the plurality of user devices wherein the document object access indication corresponds to access of the document object at the user device;
select, using a content object identification function, the content object of the group of content objects based at least in part on the document object access indication, wherein the content object identification function is dynamically updated based at least in part on the document object being accessed by one or more of the plurality of user devices; and
transmit, to the user device, an indication of the selected content object for display of the selected content object in the document object accessed at the user device.

18. The apparatus of claim 17, wherein the instructions are further executable by the processor to cause the apparatus to:

receive, from the user device, an interaction indication corresponding to a unique content object identifier associated with the content object; and update the content object identification function based at least in part on the interaction indication.

19. A non-transitory computer-readable medium storing code, the code comprising instructions executable by a processor to:

transmit, to a plurality of user devices, a document object with a field for display of a content object of a group of content objects;

receive a document object access indication from a user device of the plurality of user devices wherein the document object access indication corresponds to access of the document object at the user device;

select, using a content object identification function, the content object of the group of content objects based at least in part on the document object access indication, wherein the content object identification function is dynamically updated based at least in part on the document object being accessed by one or more of the plurality of user devices; and transmit, to the user device, an indication of the selected content object for display of the selected content object in the document object accessed at the user device.

20. The non-transitory computer-readable medium of claim 19, wherein the instructions are further executable by the processor to:

receive, from the user device, an interaction indication corresponding to a unique content object identifier associated with the content object; and update the content object identification function based at least in part on the interaction indication.

\* \* \* \* \*